United States Patent [19]

Fitts

[11] 4,182,641

[45] Jan. 8, 1980

[54] METHOD OF FORMING LAMINA AND BLOCK LAMINATES

[75] Inventor: Martin E. Fitts, Portland, Oreg.

[73] Assignee: Core-Lock Foam, Inc., Bend, Oreg.

[21] Appl. No.: 898,871

[22] Filed: Apr. 21, 1978

[51] Int. Cl.² .............................................. B32B 5/18
[52] U.S. Cl. ..................................... 156/77; 156/155;
264/45.4; 264/49; 264/293; 264/340;
264/DIG. 7; 428/306; 428/315; 521/54;
521/137
[58] Field of Search .......... 264/49, 45.4, 274, DIG. 7,
264/293, 340; 428/306, 315, 304, 310; 521/54,
59, 137; 156/77–79, 155

[56] References Cited

U.S. PATENT DOCUMENTS

| | | | |
|---|---|---|---|
| 3,256,218 | 6/1966 | Knox | 521/54 |
| 3,431,319 | 3/1969 | Baum | 521/54 X |
| 3,507,738 | 4/1970 | Prusinski et al. | 428/71 |
| 3,577,363 | 5/1971 | Klug | 521/59 |
| 3,637,459 | 1/1972 | Parish et al. | 428/315 |
| 4,121,008 | 10/1978 | Seddon | 428/315 X |

FOREIGN PATENT DOCUMENTS 2402278 8/1975 Fed. Rep. of Germany ............. 521/54

*Primary Examiner*—William A. Powell
*Assistant Examiner*—Thomas Bokan
*Attorney, Agent, or Firm*—Kolisch, Hartwell, Dickinson & Stuart

[57] ABSTRACT

A method of forming a laminate composed of a solid polyester lamina bonded to a block. A block having a matrix composed of polyurethane foam and particles of expanded polystyrene distributed therein is prepared. A layer composed of a solution of a relatively unpolymerized polyester in styrene solvent with fiberglass embedded therein is placed in contact with a surface of the block. The styrene solution of polyester dissolves polystyrene particles adjacent such block surface, leaving recesses distributed in the block matrix. These recesses become at least partially filled with the polyester solution. The solution is then cured to produce a solid resin lamina which is joined with polymerized resin contained in the matrix recesses to secure the lamina to the block.

6 Claims, 3 Drawing Figures

METHOD OF FORMING LAMINA AND BLOCK LAMINATES

BACKGROUND AND SUMMARY

The present invention relates to resin laminates, and in particular, to a laminate composed of a fiberglass-embedded solid resin lamina bonded to a resin block.

Fiberglass-embedded resin laminates are widely used today in molded structure applications, such as in forming boat hulls and vehicle bodies. The laminates generally comprise one or more fiberglass-embedded resin laminae bonded to a block, or core.

In forming a laminate of the type just described, it is usual to prepare a layer of uncured resin embedded with fiberglass, and to place the block against the uncured liquid layer. After rolling the outer surface of the layer to remove any pockets of air trapped between the block and layer, the resin forming the layer is permitted to harden, or cure, to produce a solid resin lamina secured to the block.

A material which has been successfully used as a core in such laminates includes pieces of balsa wood held together with a netting. However, the use of balsa wood has been restricted because it is generally in short supply and consequently quite expensive.

More recently, homogeneous polyurethane foam in slab form has been used as a block material in resin laminates of the above-described types. Although relatively inexpensive, the polyurethane block has not been entirely satisfactory in that polyurethane material having a suitable stiffness for use in this application, is composed primarily of closed cells. Consequently, this material is relatively impermeable to the layer of uncured polyester resin forming the resin lamina. This may prevent a satisfactory bond being formed between the resin lamina and the block.

The low permeability of the polyurethane core may also prevent satisfactory removal of any air trapped between the uncured resin and the core. Such air creates interfacial regions at which the lamina and core are unbonded.

The present invention concerns a method for forming resin laminates which largely overcomes the above-described disadvantages and problems.

By this method, a core, or block is prepared comprising a matrix composed of a solid resin matrix material and particles composed of a solid resin filler material distributed in the matrix. A layer of a solution of a relatively unpolymerized resin which forms the resin lamina is placed against a surface of the block. Such liquid resin is effective to dissolve the filler particles adjacent such block surface, forming recesses, or voids in the block matrix. These recesses become at least partially filled with the unpolymerized resin solution. At the same time any air trapped between the layer and the block tends to be sequestered in such recesses. The resin is then cured to form a solid resin lamina which is joined with polymerized resin contained in the voids in the block matrix to secure the lamina to the core.

In a preferred embodiment, a block composed of a polyurethane foam matrix having filler particles of expanded polystyrene distributed therein is prepared. A layer of a solution of polyester in styrene solvent, with fiberglass embedded therein, is formed and placed against a surface of the block. The styrene solvent is effective to solubilize the polystyrene particles adjacent such block surface, leaving recesses distributed within the polyurethane matrix. These recesses become at least partially filled with the polyester solution. Upon curing, the polyester solution forms a solid polyester lamina joined with solid polyester resin filling the block recesses.

It is an object of the present invention to provide a novel method for forming a resin laminate which largely overcomes problems and limitations associated with prior art methods of forming resin laminates.

It is yet another object of the invention to provide method for forming a resin laminate in which a layer of uncured liquid resin is placed against a surface of the block, such application producing recesses in the surface of the block, which recesses become at least partially filled with the uncured liquid resin prior to curing.

It is yet another object of the invention to provide a method of forming a resin laminate which is substantially free of trapped air at the lamina/block interface.

These and other objects and features of the present invention will now be more fully described with reference to the following detailed description of a preferred embodiment of the invention, and the accompanying drawings.

DRAWINGS

DETAILED DESCRIPTION OF THE PREFERRED EMBODIMENT OF THE INVENTION

Figure 1:
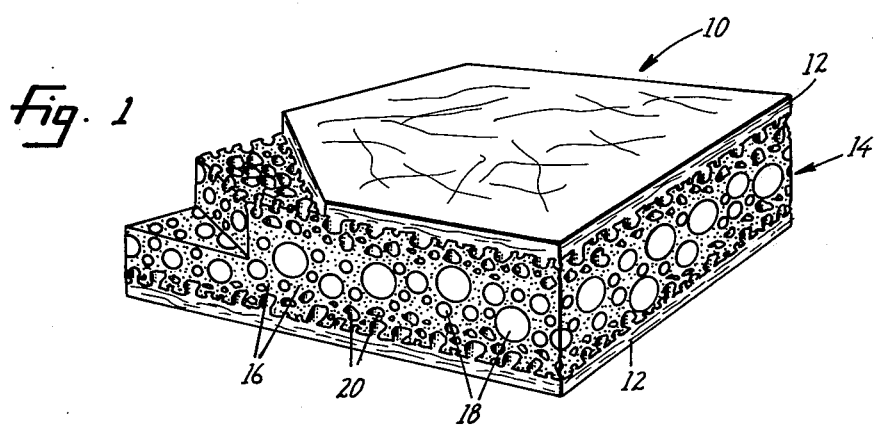
FIG. 1 is a perspective, partially cutaway view of a resin laminate formed by the method of the present invention.

Referring now to FIG. 1, there is shown at 10 a resin laminate formed by the method of the present invention. The laminate is composed of a solid resin lamina 12 secured to a block, or core, 14. Laminate 10 as formed by the method described herebelow, may be either a trilaminate having a pair of laminae secured to opposing sides of block 14, as shown in FIG. 1, or a bilaminate composed of a single lamina bonded to one side of the block (not shown).

Figure 2:
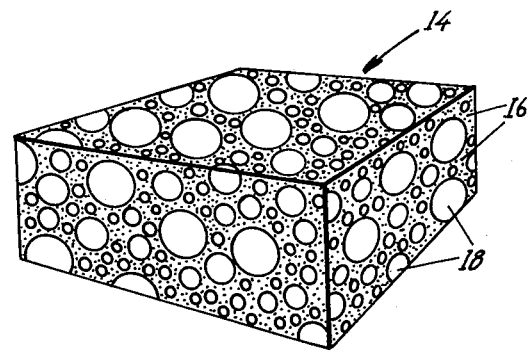
FIG. 2 is a perspective view of the block used in forming the laminate of FIG. 1.

Referring now to FIG. 2, block 14 used in practicing the present invention is composed of a matrix 16 formed of a solid resin matrix material, and filler particles 18 composed of a solid resin filler material, distributed in the matrix. The choice of resin materials used in forming the matrix and filler particles may vary widely according to the particular laminate construction desired. It is important, however, that the resin forming the matrix be substantially insoluble in a solvent which readily solubilizes the resin making up the filler particles.

Figure 3:
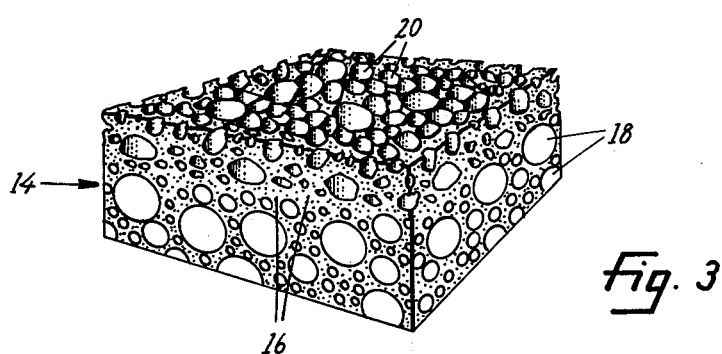
FIG. 3 is a perspective view of the block of FIG. 2 following application to the upper surface of a solvent effective to dissolve the filler particle materials in the block.

Following preparation of block 14, there is prepared a layer of the resin which forms the resin lamina, with such resin in a relatively unpolymerized liquid state. Against this layer is placed a surface of block 14. At some time prior to the curing of the resin lamina, the filler particles adjacent such block surface are dissolved by the application of a suitable solvent, forming voids, or recesses 20 distributed in the block matrix, as seen in FIG. 3. This may be accomplished by the inclusion of such solvent in the resin which forms the resin lamina, or may be accomplished by treating the block with a suitable solvent prior to placing the block in contact with the layer of resin. Recesses 20 become at least partially filled with the uncured resin forming the lamina layer. The uncured resin forming the resin lamina is then cured to produce a more highly polymerized solid lamina bonded to cured resin contained in the recesses.

In practicing the method of the invention according to a particular embodiment thereof, a block is prepared comprising a polyurethane foam matrix having filler particles of expanded polystyrene distributed therein. Such block may be prepared by combining particles of expanded polystyrene with a suitable diisocyanate-terminated polymer to produce a prepolymer/filler mix. The polystyrene particles employed are similar in density and compressibility to the polystyrene pieces commonly used in packing material, and preferably have an average diameter of about 1 to 4 mm.

The prepolymer/filler mix is formulated with a suitable catalyst and blowing agent to produce a polyurethane foam matrix having the polystyrene particles evenly distributed therethrough. The polyurethane foam formulation may be processed by block slab manufacture, molding, or other suitable foam processing technique. The reader is referred to *The Development and Use of Polyurethane Products,* Doyle, E. N., McGraw-Hill, Inc., New York (1971), pps. 232–292, for details concerning formulating and processing conventional polyurethane foams. The foam matrix obtained is preferably a rigid polyurethane foam having a 90–95% closed cell structure. The polystyrene particles distributed in the foam preferably constitute about 5–20% of the final weight of the block.

Block 14 formed by the method described above, and cut to a suitable block thickness, is illustrated in FIG. 2. Here matrix 16 is polyurethane foam and particles 18 are polystyrene spheres. Although the block shown in FIG. 2 is planar sheet such as might be used in forming a substantially planar laminate, the block may be prepared by a mold process, to produce a block having any desired shape.

Core 14, by reason of the expandable polystyrene particles distributed therethrough, is somewhat more flexible, and less frangible, than a homogeneous polyurethane foam block having a similar 90–95% closed cell structure. As a result, block 14 may be used in practicing the invention where it is desired to form laminates having a relatively small radius of curvature.

The method of practicing the invention will be further described with reference to a polyester resin lamina having fiberglass embedded therein. This layer comprises fiberglass, such as fiberglass strands, in a styrene solution of a polyester, such as a conventional linear glycol-maleic anhydride polyester. Usually about 1% hydroperoxide catalyst is included in the resin solution to promote curing. The uncured resin is also referred to herein as a resin in a relatively unpolymerized state; following curing, or hardening, the resin is referred to as a more highly polymerized solid resin.

The layer may be prepared by repeated application of the resin solution with fiberglass therein directly to a surface of the block to form a lamina buildup thereagainst. Alternatively, a layer of resin having fiberglass embedded therein may be built up against the side of a mold and the block placed thereagainst prior to curing. In both of the above methods of forming a lamina buildup against a surface of the block, the block is in contact with the liquid components of the resin solution. During this contact, the styrene in the resin layer is effective to dissolve the polystyrene particles in the block adjacent the layer.

As the polystyrene filler particles are dissolved by contact with the lamina buildup, there are left recesses, or voids 20 distributed in the polyurethane matrix adjacent the resin layer, as shown in FIG. 1. These recesses become partially or completely filled with the solution of uncured polyester forming the layer prior to curing, or hardening the resin. Further, any air which may be trapped between the block and the lamina buildup tends to collect in these voids. Thus, trapped air may be effectively removed without rolling the lamina buildup prior to curing.

Curing of the above-described styrene solution of glycol-maleic anhydride polyester involves the formation of a cross-linked polymer between styrene and the maleate groups of the glycol by peroxide-induced free radical polymerization. Exposure to air at room temperature (24°C.) for a period of at least twenty minutes is recommended in the curing of such polyester resin. As can be appreciated, the liquid resin forming the lamina and that which has partially filled the block recesses become consolidated, or joined, upon curing to form a strong bond between the lamina and the block. Further, the interface between lamina and block is substantially free of trapped air, which tends to be sequestered in the block recesses.

In the above, the method of forming a laminate includes preparing a layer of uncured resin contained in a solvent effective to solubilize filler particles within the block. In some laminates, it may be undesirable to include in the resin forming the lamina, a component capable of solubilizing the block filler particles. Such might be the case in bonding a lamina formed from polyurethane or epoxide resin to a polyurethane block of the type described above. In such case, the present invention may be practiced by pretreating the block with an appropriate filler particle solvent, e.g., styrene, to produce voids therein prior to placing the block against the lamina buildup.

FIG. 3 illustrates the appearance of block 14 following treatment of its upper surface with a solvent effective to dissolve particles 18, forming recesses 20 in the block upper surface. Upon contact with a layer of relatively unpolymerized resin, recesses 20 become at least partially filled with this resin. After curing, the solid resin lamina is consolidated with the polymerized resin contained in the block recesses, bonding the lamina securely to the block.

A method for producing a resin laminate having a solid resin lamina secured to a resin block has been disclosed. Although specific matrix and filler particle resins forming the block, resins and solvents forming the lamina, and conditions used in forming the laminate have been described for purposes of illustration, the scope of the invention is intended to be encompassed by the following claims:

It is claimed and desired to secure by Letters Patent:
1. A method of forming a laminate composed of a solid resin lamina secured to a surface of a block comprising
preparing a block comprising a matrix composed of a solid resin matrix material, and particles composed of a solid resin filler material distributed in said matrix, said resin matrix material being substantially insoluble in a filler material solvent which readily solubilizes the filler material, preparing a layer of resin which forms the resin lamina, with such resin in a relatively unpolymerized liquid state, placing a surface of said block in contact with said layer of resin, and curing said layer of resin to produce a more highly polymerized solid resin lamina adhering to said block, the particles of resin filler material adjacent said surface prior to the curing of said layer of resin being dissolved by the application of filler material solvent to leave voids distributed in said matrix which are at least partially filled with the resin of said layer with such in its liquid state.

2. The method of claim 1, wherein the layer of liquid resin is prepared with the inclusion in said layer of said filler material solvent.

3. The method of claim 1, wherein said layer of liquid resin comprises a styrene solution of a polyester.

4. The method of claim 1, wherein said solid resin matrix material is polyurethane foam, and said solid resin filler material is polystyrene.

5. A method of preparing a laminate composed of a solid resin lamina secured to a surface of a block comprising preparing a block comprising a matrix composed of a solid resin matrix material and particles composed of a solid resin filler material distributed in said matrix, said matrix material being substantially insoluble in a filler material solvent which readily solubilizes the filler material, preparing a layer of resin which forms the resin lamina, with such resin in a relatively unpolymerized liquid state, said layer including said filler material solvent, placing a surface of said block in contact with said layer of liquid resin, and through such contact, dissolving with the filler material solvent included in said layer, the filler particles in said matrix adjacent said surface to form voids distributed in said matrix which become at least partially filled with the resin of said layer, and curing said layer of resin to produce a more highly polymerized solid resin lamina, said solid lamina being joined with more highly polymerized solid resin contained in said voids to secure said lamina to said block.

6. A method of forming a laminate composed of a solid polyester lamina secured to a block, said lamina being embedded with fiberglass, said method comprising preparing a block comprising a matrix composed of polyurethane foam and polystyrene particles distributed therein, preparing a layer which comprises a styrene solution of polyester with fiberglass embedded therein, placing a surface of said block in contact with said layer, and through such contact, dissolving with the styrene included in said layer, the polystyrene particles in said matrix adjacent said surface to form voids therein which become at least partially filled with said solution, and curing said solution to form said solid polyester lamina, said lamina being joined with solid polyester contained in said voids to secure said lamina to said block.

* * * * *